United States Patent [19]
Ohta

[11] Patent Number: 6,163,623
[45] Date of Patent: Dec. 19, 2000

[54] METHOD AND APPARATUS FOR RECOGNIZING IMAGES OF DOCUMENTS AND STORING DIFFERENT TYPES OF INFORMATION IN DIFFERENT FILES

[75] Inventor: Junichi Ohta, Kanagawa-ken, Japan

[73] Assignee: Ricoh Company, Ltd., Tokyo, Japan

[*] Notice: Under 35 U.S.C. 154(b), the term of this patent shall be extended for 653 days.

[21] Appl. No.: 08/507,194

[22] Filed: Jul. 26, 1995

[30] Foreign Application Priority Data

Jul. 27, 1994 [JP] Japan ................................. 6-175646

[51] Int. Cl.⁷ .................................................. G06K 9/00
[52] U.S. Cl. .......................................... 382/176; 382/180
[58] Field of Search .................................... 382/173, 175, 382/176, 177, 178, 179, 180, 286, 112, 113, 101, 102; 358/403

[56] References Cited

U.S. PATENT DOCUMENTS

| | | | |
|---|---|---|---|
| 4,959,769 | 9/1990 | Cooper et al. | 364/200 |
| 5,018,083 | 5/1991 | Watanabe et al. | 364/523 |
| 5,105,284 | 4/1992 | Sakata et al. | 358/404 |
| 5,157,737 | 10/1992 | Sklarew | 382/13 |

*Primary Examiner*—Bijan Tadayon
*Attorney, Agent, or Firm*—Oblon, Spivak, McClelland, Maier & Neustadt, P.C.

[57] ABSTRACT

A method and apparatus for processing images of a document containing characters, tables and figures. After the documents are scanned, the various areas including the character images, table images, and figure images are grouped in accordance with the type of image. Different file names are assigned to each of the character section, table section, and figures. A portion of the file names for each of the character images, table images, and figures may be the same in order to indicate that the characters, tables, and images belong to the same document. Extensions may be assigned to the file names indicating whether the file contains characters, tables, or figures. Further, a number may be stored to indicate the table number, figure number or character image number. If newspaper or magazine articles are scanned, the various sections of the articles may be arranged automatically in order to make the information easier to utilize and to have an efficient use of the paper.

29 Claims, 19 Drawing Sheets

```
┌─────────────────────────────────────┐
│ ┌─ ─ ─ ─ ─ ─ ─ ─ ─ ─ ─ ─ ─ ─ ─ ─ ┐ │
│ │ 海外旅行募集のおしらせ          │ │──── AREA DESIGNATED
│ │                                 │ │     FOR PROCESSING
│ │ 以下のとおり、海外旅行を募集します. │ │
│ └─ ─ ─ ─ ─ ─ ─ ─ ─ ─ ─ ─ ─ ─ ─ ─ ┘ │
│ ┌─ ─ ─ ─ ┐                          │
│ │行き先 :│ハワイ                    │
│ │日程   :│1995年8月10日〜20日       │
│ │費用   :│8,9000円                  │
│ │人数   :│20名                      │
│ │        │                          │
│ │締切   :│1995年4月1日              │
│ │提出先 :│総務課                    │
│ └─ ─ ─ ─ ┘                          │
│ ┌─ ─ ─ ─ ─ ─ ─ ─ ─ ─ ─ ─ ─ ─ ─ ─ ┐ │
│ │ <注意事項>                      │ │
│ │ 先着順にて、定員になり次第、受付終了│ │
│ │ パスポートは各自で準備してください │ │
│ └─ ─ ─ ─ ─ ─ ─ ─ ─ ─ ─ ─ ─ ─ ─ ─ ┘ │
└─────────────────────────────────────┘
```

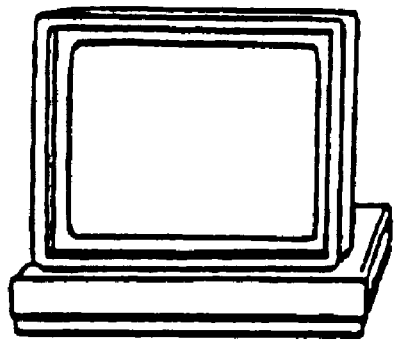
FIG. 15

METHOD AND APPARATUS FOR RECOGNIZING IMAGES OF DOCUMENTS AND STORING DIFFERENT TYPES OF INFORMATION IN DIFFERENT FILES

BACKGROUND OF THE INVENTION

1. Field of the Invention

This invention relates to the field of document image processing systems, and more particularly relates to optical character recognition (OCR) systems. The invention further relates to a method and system which stores characters, tables, and figures in separate files. The invention further relates to the rearrangement of sections of an article in order to more easily utilize the information in the article and to have efficient use of paper.

2. Discussion of the Background

Various aspects of recognizing features of an image of a document by a computer implemented process are known. For example, a method of extracting character images from a document image inputted as a bit-mapped image is proposed in Japanese patent application 4-17086, which is incorporated herein by reference. Also, a method to recognize handwritten characters and a method to vectorize figures is proposed in Japanese application 4-165477. As another method of recognizing character images, a method to recognize separately the areas made of characters, photographs, figures and table images, respectively, and identify lines of characters which appear on the top of the table images constituting the title for the table and below figures or photographs constituting explanations of the figures and photographs is proposed in Japanese application 4-287,168 which is incorporated herein by reference. However if one wants to utilize data from a particular document obtained through a character recognition process, different types of software are needed to handle the respective data such as word processing software for handling character data and other software to handle the processing of figures. Therefore, even if data of an original document can be recognized as containing characters, figures and table images, there remains a problem that it is not easy to utilize this data with different types of software if this data is only stored in one file.

Further, when articles processed by the optical character recognition software are from a newspaper or from magazine, articles which are often made of blocks of sub-articles extend over multiple columns. In such cases, the shapes of the areas containing the article are rather complex and there exists a problem that the data so arranged cannot be efficiently used and also wastes paper space.

SUMMARY OF THE INVENTION

Accordingly, it is an object of the invention to store in separate files character information, table information, and figures after this information is obtained from a document which has been scanned. It is a further object of the invention to rearrange the sub-articles making an article appearing in a magazine, newspaper, or other publication in order to efficiently use paper space and to be able to properly utilize the desired information.

These and other objects are accomplished by a method and apparatus for processing images of a document containing separate areas of character images, table images, and figure images. The character images in the areas designated by the operator are recognized and converted to corresponding character codes, and the character codes and the image data for each recognized area are recorded on a recording media with different file names being assigned for each recognized area. The file names may be automatically assigned with the file names for the different portions of the document having a common portion to indicate that the files originated from the same document. Further, a file number is assigned to the various areas of the document in the order of being read by the recognition process. Accordingly, when the data obtained is to be utilized by software such as word processing software, table processing software, or image processing software, the data can be easily retrieved by the different types of software by quickly referring to the assigned file names.

Another feature of the invention is that the shape of an area may be corrected to more effectively and efficiently use the space of a page. Accordingly, even if an original document is from a newspaper or magazine and is made up of several blocks of sub-articles extending into multiple columns and having a complex shape, the image data in this area is rearranged into a more simpler shape in order to more easily utilize this data and to more efficiently utilize the space on the page.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 7 is an illustration showing an example of an input document;

FIG. 8 is an illustration showing an example of an output image;

FIG. 10 is an illustration showing an output image from the process shown in FIG. 9;

FIG. 12 is an illustration showing an area designated for character recognition processing;

FIG. 13 is an illustration showing an example of an output image resulting from performing a character recognition process on the designated areas illustrated in FIG. 12;

FIG. 15 is an illustration showing an example of an input document;

DESCRIPTION OF THE PREFERRED EMBODIMENTS

Figure 1:
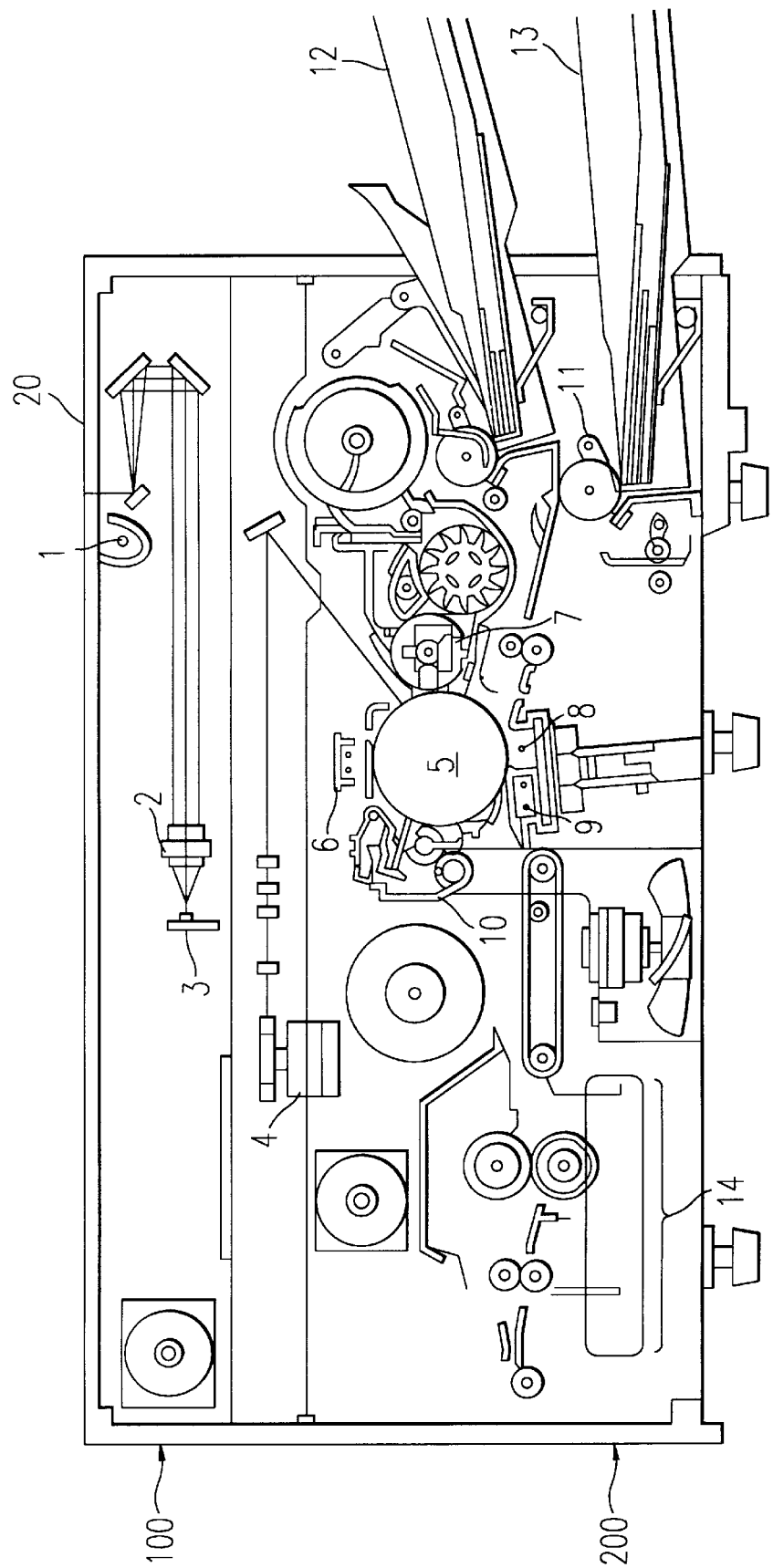
FIG. 1 is a schematic drawing of a digital copying machine according to the present invention.

Referring now to the drawings, wherein like reference numerals designated identical or corresponding parts through the several views, and more particularly FIG. 1 thereof, there is illustrated a digital copying machine embodying the present invention. The digital copier is made of an image scanner 100 and a laser printer 200, the former being placed on top the latter. A contact glass 20 for placing original documents thereupon is provided on top of the image scanner 100 and thereunder is provided an optical scanning system equipped with an exposure lamp 1, various mirrors, a lens 2, a light receiving unit 3 and so forth.

An original document placed on the contact glass 20 is exposed by the exposure lamp 1 and the reflected light from the original document, which is the light representing the image of the original document, is passed to the light receiving unit 3 through various mirrors and the lens 2. In the light receiving unit 3 is provided an image sensor 110 illustrated in FIG. 2 which is made of a charge coupled device (CCD). The optical scanning system is driven in the direction of right and left in the drawing by a mechanical driving system and the reflected light from the original document is read line by line by the image sensor 110.

The reflected light from the original document read by the image sensor 110 is converted to output images by a process described later. The output images are created by modulated laser beam light which is outputted from a writing unit 4 of the laser printer 200, forming the output image on the surface of a photoconductive drum 5 through an optical system of the writing unit. The surface of the photoconductive drum 5 is uniformly charged at a prescribed level by a main charger 6 prior to being exposed to the laser beam light. The charging level is changed when exposed in accordance with the strength of the laser beam light, thereby forming the electrostatic latent images, corresponding to the images of the original document on the surface of the photoconductive drum.

The electrostatic latent images formed on the surface of the photoconductive drum 5 are made visible by attracting toner particles when passed through a developing unit 7, thus forming toner images on the surface of the photoconductive drum. Next, recording paper is fed out by the paper feeding roller 11 from either of the paper cassettes 12 or 13 and contacts the surface of the photoconductive drum 5 in synchronism with the timing of the toner images being formed on the surface of the photoconductive drum. The toner images on the surface of the photoconductive drum 5 are transferred onto the paper due to a charge placed on the paper by a transfer charger 8. The paper on which the toner images have been transferred is then separated from the photoconductive drum 5 by a separating charger 9 and ejected from the copying machine after the toner images are affixed onto the paper by a fixing unit 14. After a completion of the toner image transfer and the separation of the paper from the surface of the photoconductive drum 5, the surface of the photoconductive drum 5 is cleaned by a cleaning unit 10 in preparation for forming the next image thereupon.

Figure 2:
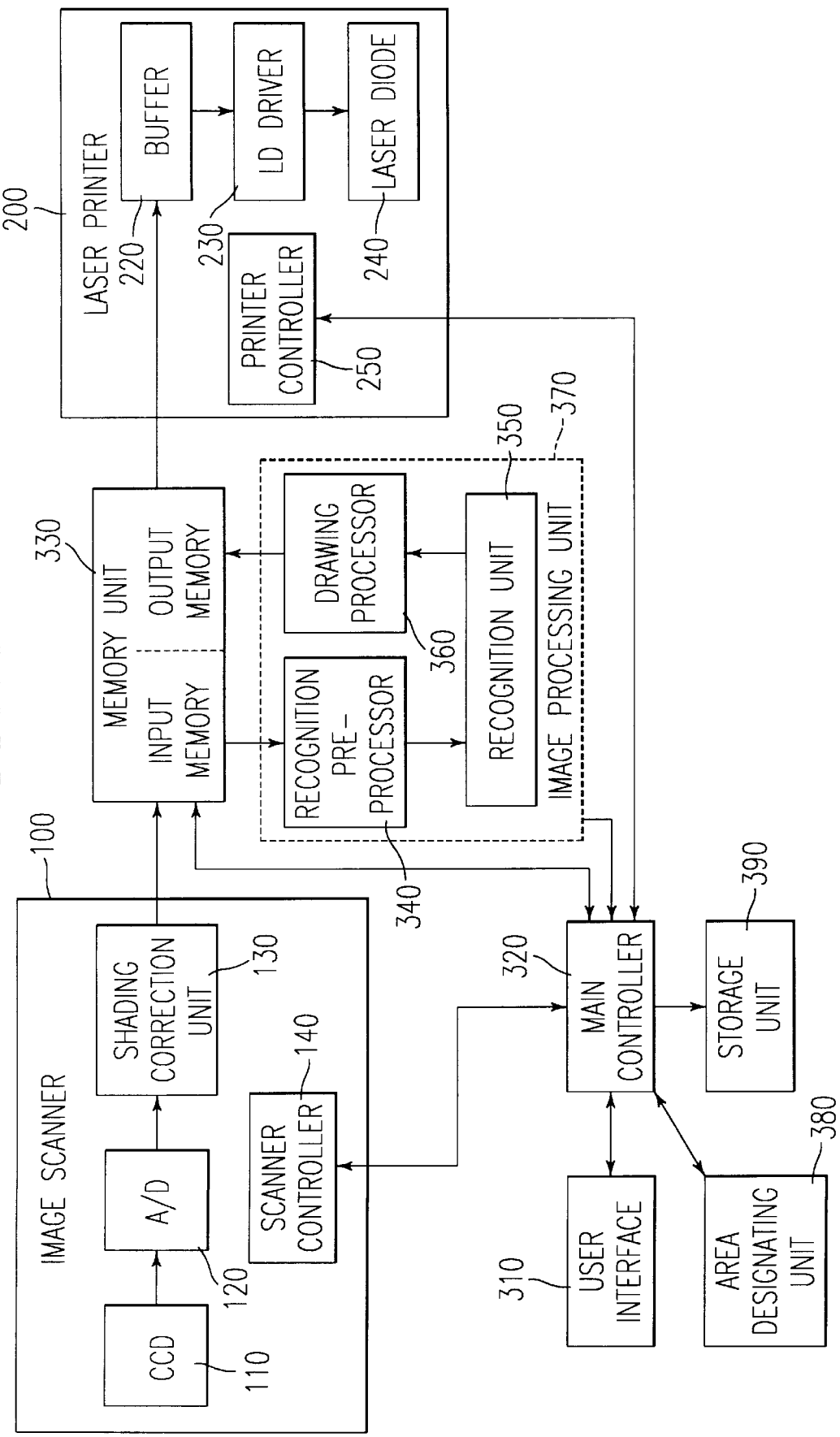
FIG. 2 is a block diagram of an image processing unit of the digital copying machine shown in FIG. 1.

Next, a block diagram of the electrical components of the digital copying machine are explained with respect to FIG. 2. In the image scanner 100, a signal of an image of an original document in a bit-mapped format received from the CCD image sensor 110 is converted to a digital signal by an A/D (analog to digital) converter 120, treated by a correction process for density ununiformity by a shading correcting unit 130, and then recorded in an input memory of a memory unit 330. The shading correcting unit 130 makes the image density uniform across the width of the scanned document in a known manner. The shading correcting unit 130 is preferably implemented using a custom LSI but could be implemented using a programmed microprocessor. The memory unit 330 can be constructed using a two port RAM or a conventional DRAM. The image processing unit 370 processes the input image information recorded in the input memory of the memory unit 330 and forms the output image information in the output memory of the memory unit 330 as described later.

The output image information in the memory unit 330 is outputted to the laser printer 200 in the form of binary information corresponding to white and black pixels, passes through a buffer 220 which is a dual port RAM or a conventional DRAM, to an LD (laser diode) driver 230 and to a laser diode 240. The buffer preferably holds at least one line of output information. Accordingly, the laser diode 240 emits a laser beam light modulated in accordance with the output image information. The laser beam light is outputted from the writing unit 4 shown in FIG. 1 and exposed on the surface of the photoconductive drum 5 via the optical system of the writing unit.

Instructions from an operator are inputted via a key of a keyboard or keypad, or other input device of a user interface 310 provided on the upper portion of the copying machine. The user interface 310 also includes a display such as an LCD or CRT for displaying operational guidance including information regarding the copying process. A main controller 320 controls display operations and also reads key inputs from the user interface 310, thereby instructing a start of scanning, outputting and so forth. The main controller 320 may be implemented using a programmed microprocessor. Also, an operator can designate the areas of the original document to be processed by an area designating unit 380 which may be constructed using an electronic tablet and a writing pen or other conventional pointing device. A storage unit 390 is a floppy disk, a hard disk or other storage device such as a semiconductor memory and stores the result obtained from the processing by the image processing unit 370.

While the invention is described with respect to a digital copier, the functions of the invention concern the optical character recognition (OCR) and other processing of scanned images. Therefore, the invention is not limited to a digital copier but can be practiced using any device which manipulates images, such as a personal computer running appropriate software. The images which are processed may be obtained in any manner including by a scanner connected to a personal computer and the output of the recognition processing may be sent to any display device such as a LCD, CRT, or printer. Further, the invention is capable of performing the functions disclosed in U.S. Pat. No. 5,195,147, entitled "Image Forming Apparatus" which is incorporated herein by reference.

Figure 3:
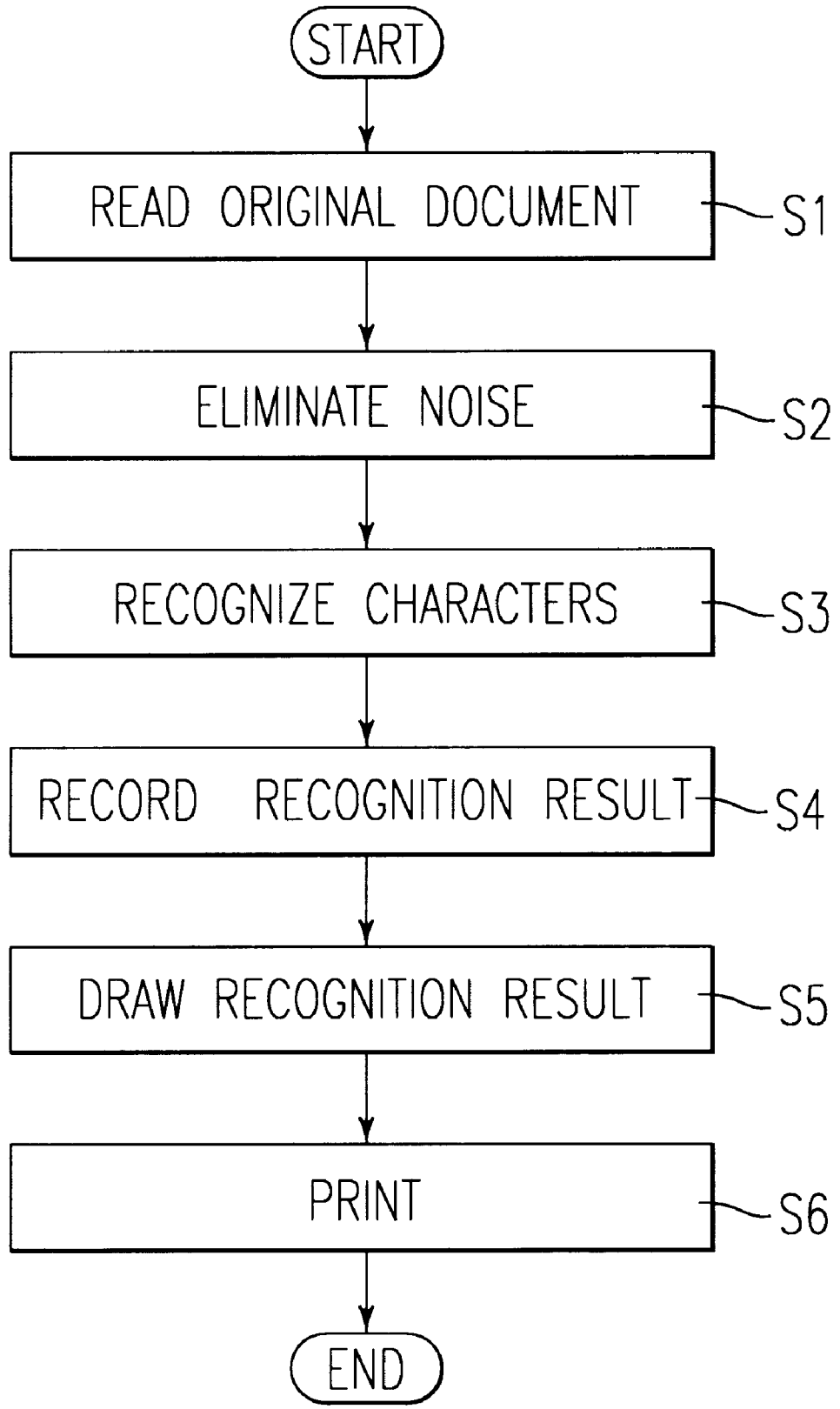
FIG. 3 is a flowchart illustrating an outline of a copying process.

Next, an outline of a copying process is explained referring to the flowchart illustrated in FIG. 3. When a character recognition mode is selected via the user interface 310, the image scanner 100 reads in step S1 such a document as illustrated in FIG. 7 and the image data from the document is stored in the input memory of the memory unit 330. Then in step S2, the recognition pre-processor 340 in the image processor 370 eliminates small black pixels caused by dust or dirt on the contact glass. More particularly, only the areas containing characters and figures images are extracted, eliminating noise and screen image areas. Also, the kind of image data contained in each areas extracted are determined and such areas are rearranged in groups for recognition processing as described later. The image processing unit 370 including the recognition pre-processor 340, recognition unit 350, and drawing processor 360 are implemented using one or more programmed microprocessors.

Figure 4:
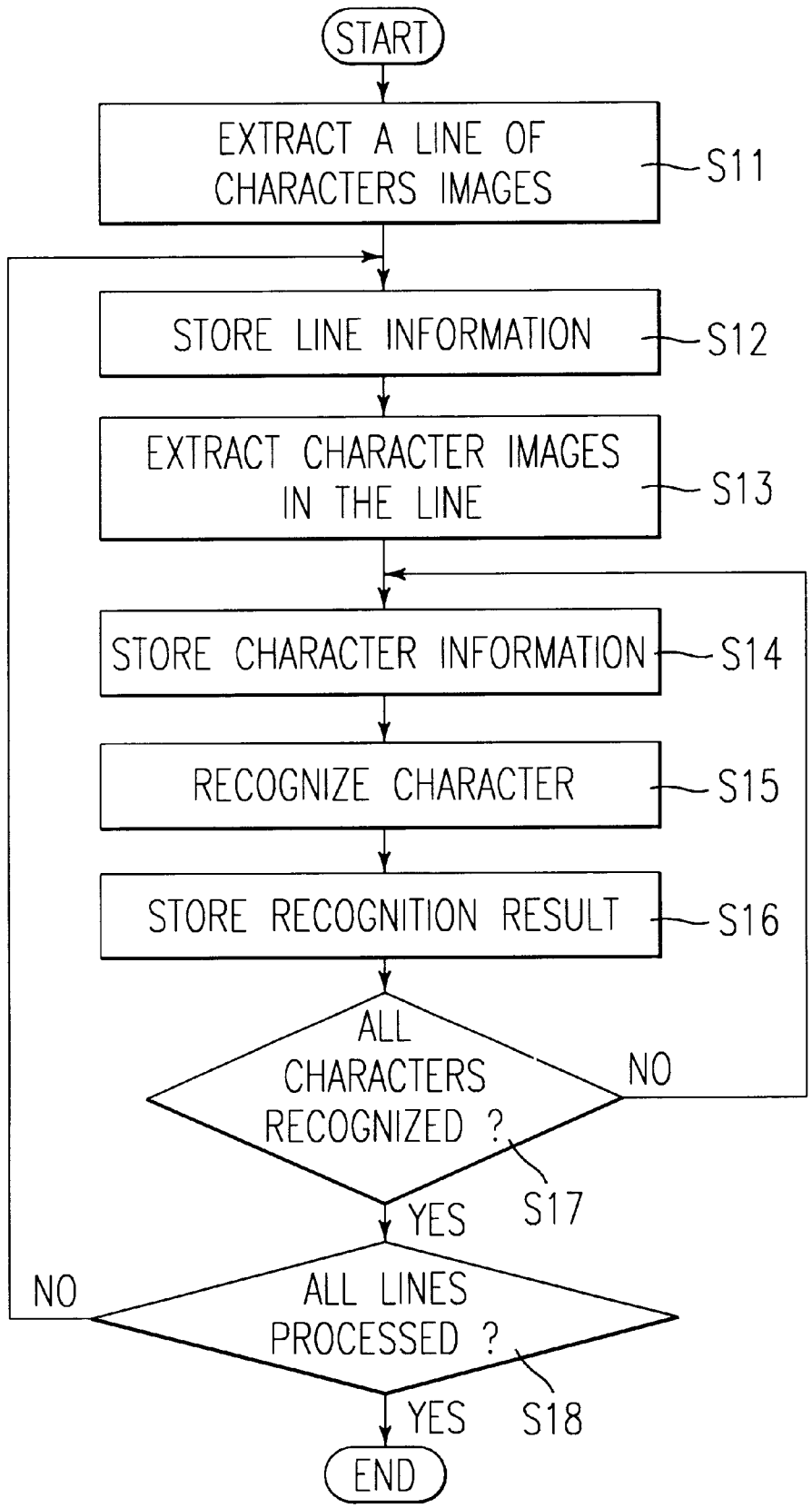
FIG. 4 is a flowchart explaining in detail a character recognition process shown in FIG. 3.

The recognition unit 350 processes in step S3 the character images as shown in detail in the flowchart of FIG. 4 and outputs coordinates and sizes information of each character image, character codes resulting from the recognition processing and rated values indicating the reliability of the recognition processing. Also the recognition unit 350 performs the table recognition processing for the areas containing the table images and figure recognition processing for the areas containing figure images after vectorizing the figures information. The resulting data from such recognition processings are sent to the main control unit 320 and then stored in step S4 in a floppy disk or the like in the storage unit 390 with a file name inputted from the user interface 310 as shown in details in FIG. 5 or with a file name automatically assigned. Next the drawing processor 360 reproduces the input image based upon the result of the recognition processing by the recognition unit 350 as shown in detail in FIG. 6, and generates the output image in the output memory of the memory unit 330. The output image stored in the memory unit 330 is printed on a sheet of paper by the laser printer 200 in step S6 and ejected from the copier.

Next, a process of the character recognition shown as step S3 in FIG. 3 is explained in detail referring to FIG. 4. First, in step S11, areas of a line of character images are extracted from the input images, and the number and the coordinates of such areas of a line of characters images are determined. One of such areas of a line of characters images is taken out from the input image and the information showing the location of this area is stored in step S12. Subsequently, the character images in this area are extracted and the number of the characters and the coordinates of each characters are calculated in step S13 and stored in step S14. A process for recognizing the stored characters is performed in step S15 and the result of the recognition as well as the rated value for the reliability of the recognition processing are stored in step S16. Steps S14–S16 are repeated for each character contained in a line image, and steps S12–S17 are repeated for each area of a line of characters images until all lines are determined to be processed in step S18.

Figure 5:
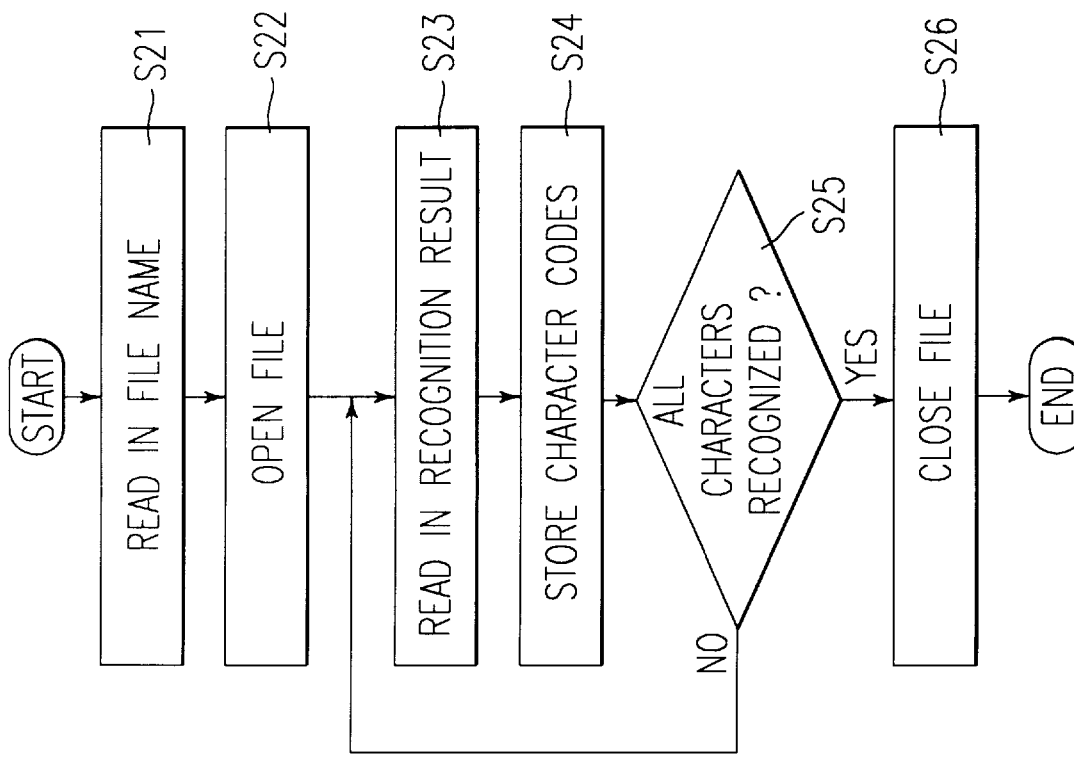
FIG. 5 is a flowchart explaining in detail a process of recording a result of the character recognition shown in FIG. 3.

Next, the process of storing the results of the recognition processing shown as step S4 in FIG. 3 is explained in detail referring to FIG. 5. After the process of character recognition is completed, the main controller 320 reads in step S21 the file name inputted from the user interface 310 or the file name automatically assigned by the main controller 320 and opens the file in step S22. The result of the recognition which indicates the location and the size of each character and the corresponding character code are read character by character from the recognition unit 350 and stored in a format corresponding to an application program in step S24. If step S25 determines that not all characters have been processed, steps S23 and S24 are repeated until all characters have been processed. Thereafter, step S26 closes the file.

Figure 6:
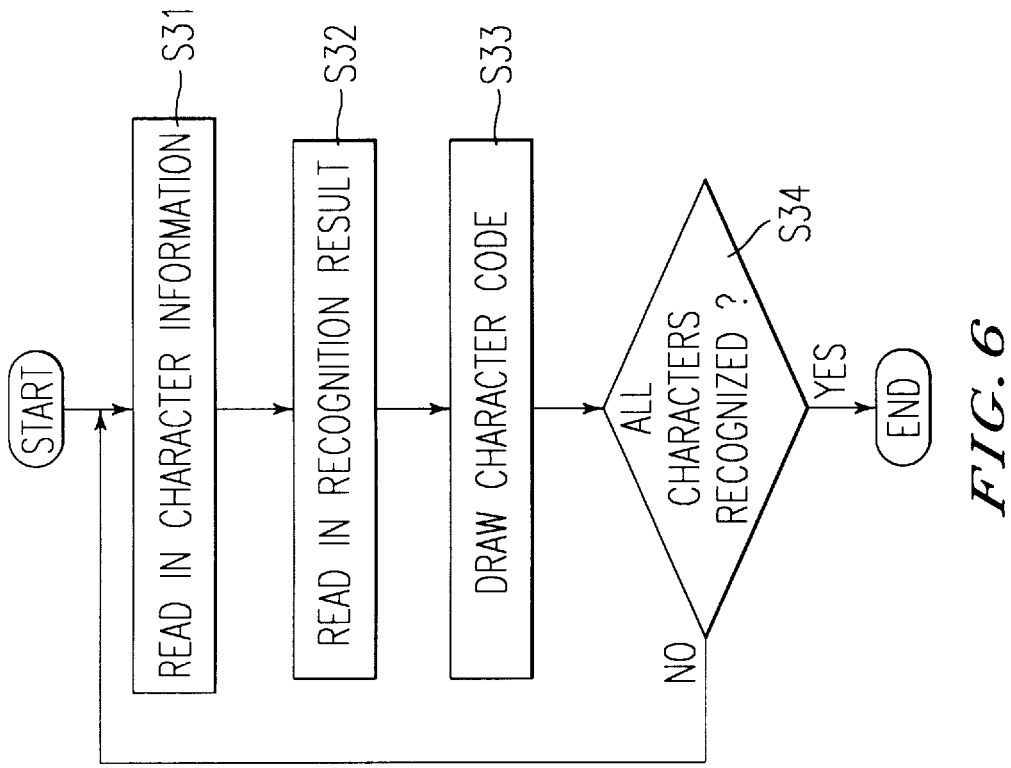
FIG. 6 is a flowchart explaining in detail an example of a process of drawing characters shown in FIG. 3.

Next, an example of a process of drawing shown as step S5 in FIG. 3 is explained in detail referring to FIG. 6. The drawing processor 360 reads in the result of the recognition indicating the location and the size of the characters from the recognition unit 350 in step S31 and step S32 reads in the character codes which are a part of the recognition result. The recognized characters codes are drawn at appropriate locations having sizes which correspond to the input image in step S33. Steps S31, S32, and S33 are repeated until step S34 determines that all characters have been processed.

FIG. 8 illustrates an example of the result of processing the original document shown in FIG. 7, and it is seen that various differences exist between FIGS. 7 and 8 which are due to recognition errors. These differences are explained with respect to FIG. 10. An operator can check the result of processing by comparing the images shown in FIG. 7 and FIG. 8. Further, the result of the recognition can be stored in a floppy disk for later use. Also, the portions not recognized correctly can be identified easily after printing on paper the information illustrated in FIGS. 7 and 8.

Figure 9:
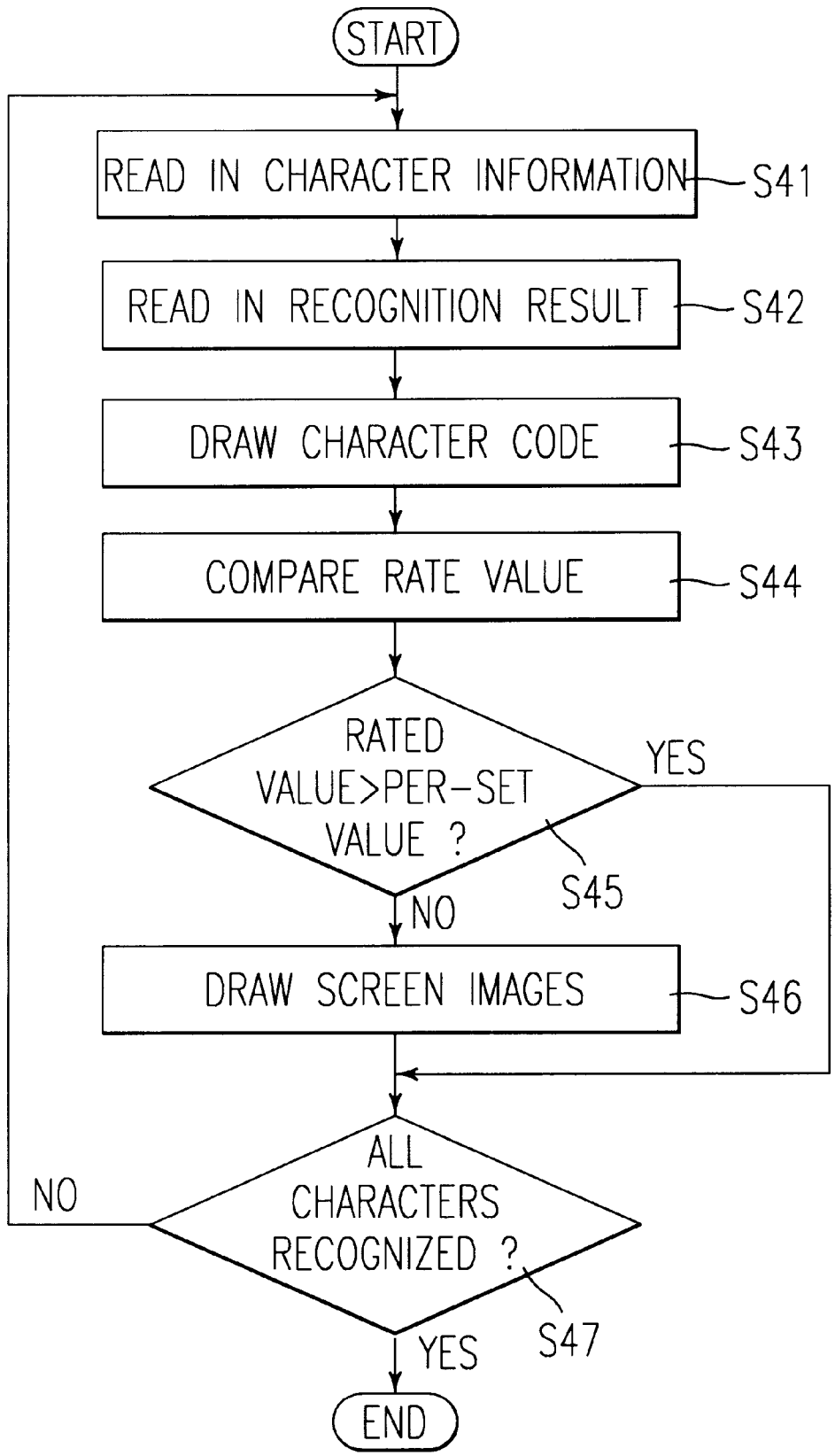
FIG. 9 is a flowchart illustrating another process of the invention of drawing characters shown in FIG. 3.

Next, another example of the drawing processing shown as step S5 in FIG. 3 is explained in detail referring to FIG. 9. The drawing processor 360 reads in the result of the recognition showing the location and the size of the characters from the recognition unit 350 as well as the character codes resulting from the recognition in steps S41 and S42. The character codes are then drawn in step S43 at such locations and with such size as shown in the input image. After that, the drawing processor 360 reads in the rated value of the reliability of the recognition processing for each character and highlights the characters whose rated value is smaller than a preset or predetermined value by drawing images of screens or other manners of highlighting in steps S44, S45 and S46. The above-mentioned processes are repeated for each character until step S47 determines that all characters have been processed. FIG. 10 illustrates the characters of FIGS. 7 and 8 which are highlighted by screens when the rated reliability is less than the predetermined reliability. The highlighting allows an operator to easily identify the portions which may not be recognized correctly by the optical character recognition software.

Figure 11:
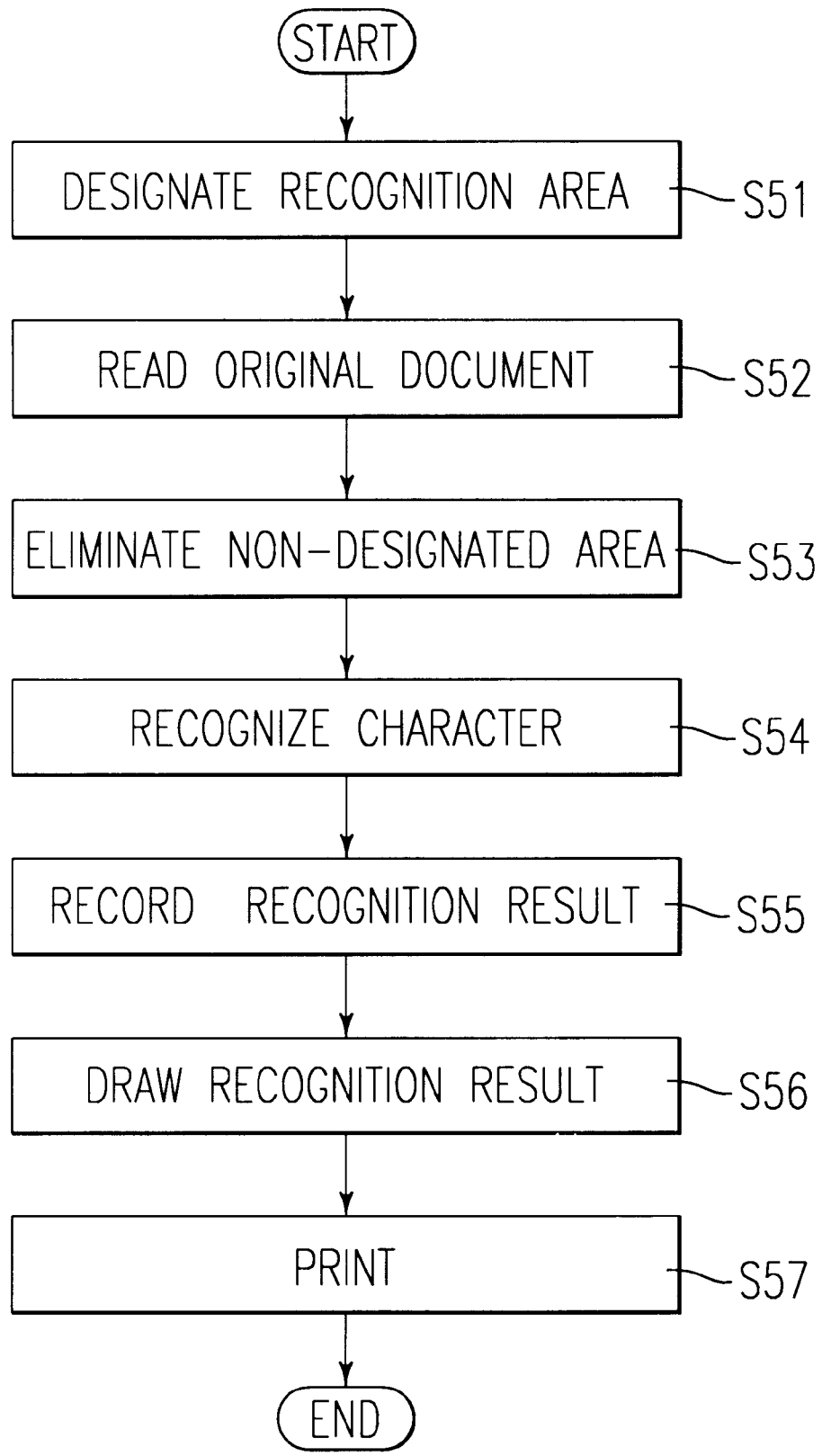
FIG. 11 is a flowchart illustrating an outline of a copying process in which areas for a character recognition processing are designated.
Figures 12, 13:
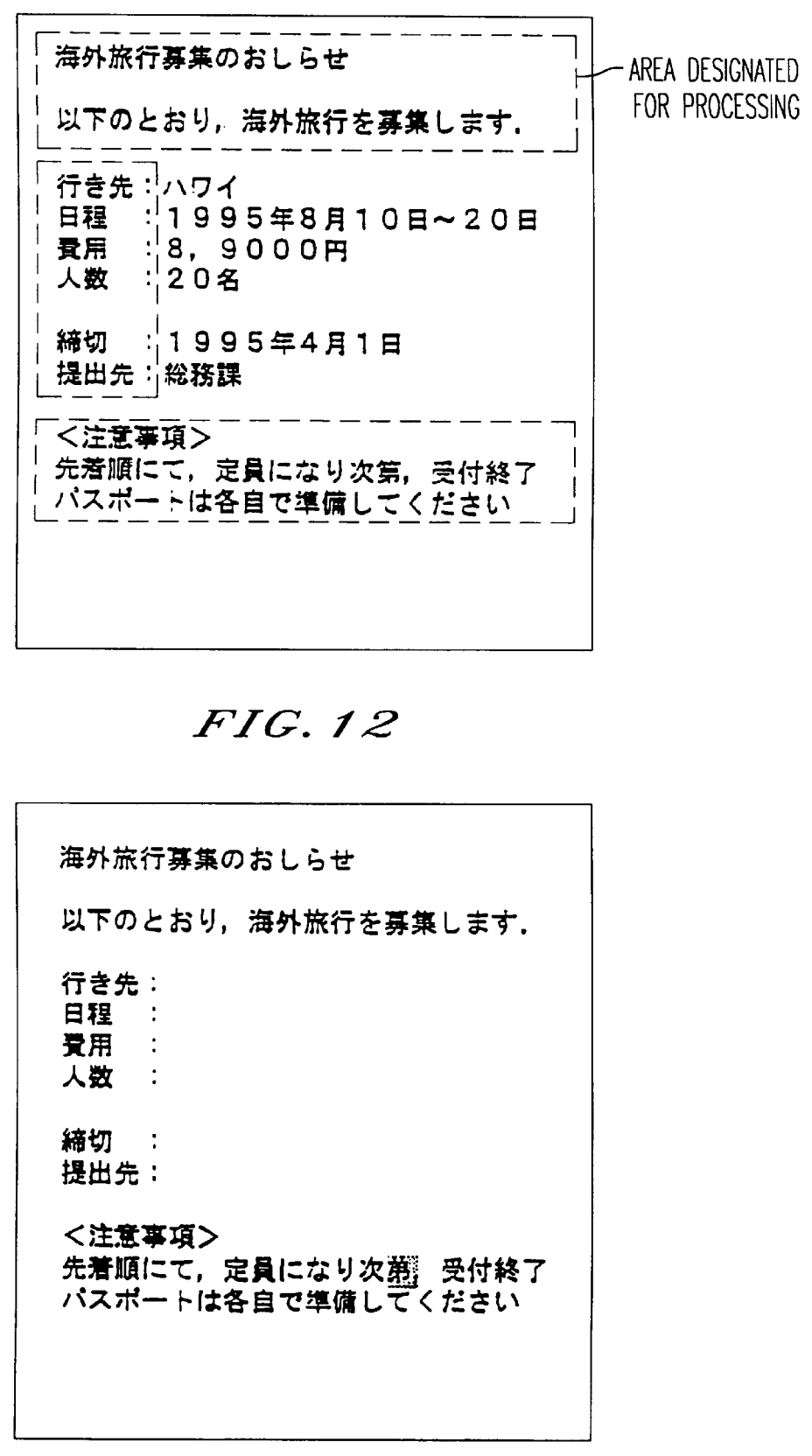

Next, a process of copying (scanning, OCR processing, storing and printing) only designated areas is explained referring to FIGS. 11–13. First, the areas for recognition processing are designated via the area designating unit 380 in step S51 of FIG. 11. In FIG. 12, the areas designated for processing are surrounded by broken lines. The original document is then scanned or read by the image scanner 100 and stored in the input memory of the memory unit 330 in step S52. Alternatively, the recognition areas may be designated after the page is scanned.

The recognition pre-processor 340 first eliminates the areas other than those designated for recognition processing in step S53 and then performs the character recognition processing in step S54. The result of the recognition processing is stored in step S55, draws or generates such result in step S56 and prints out only the areas designated via the area designating unit 380 as shown in FIG. 13 in step S57 to complete the recognition processing. Since only the areas of the original document desired by the operator to be processed are designated as explained above, the size or amount of the images to be processed is reduced and accordingly, the time required for recognition processing is reduced. The portions whose rated value for the recognition reliability is lower than the preset value are highlighted by screen images in this case also as shown in FIG. 13, so that the operator can identify easily the portions which may not be recognized correctly.

Figure 14:
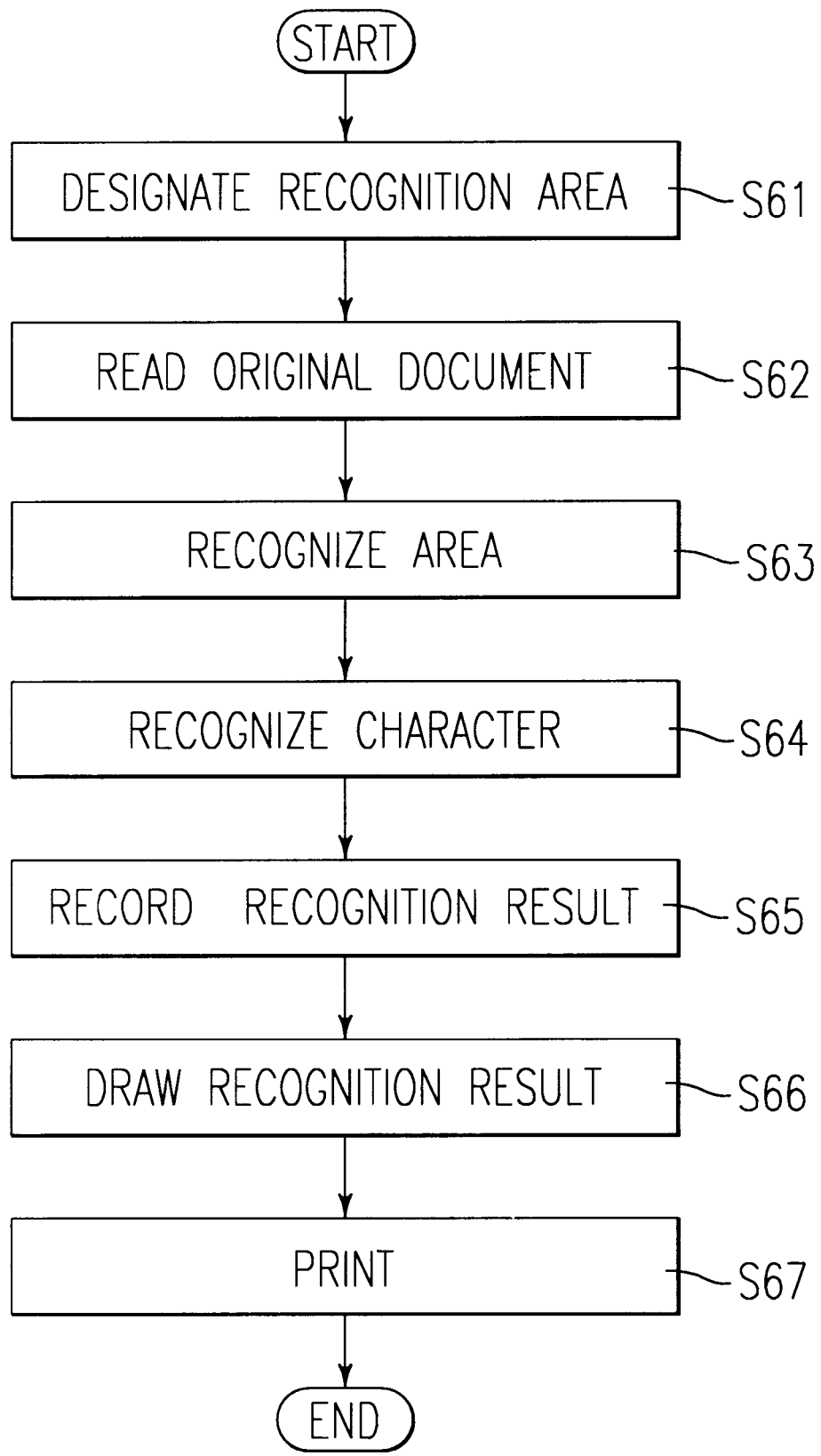
FIG. 14 is a flowchart explaining an outline of an another example of a copying process in which areas for a character recognition processing are designated.
Figure 16:
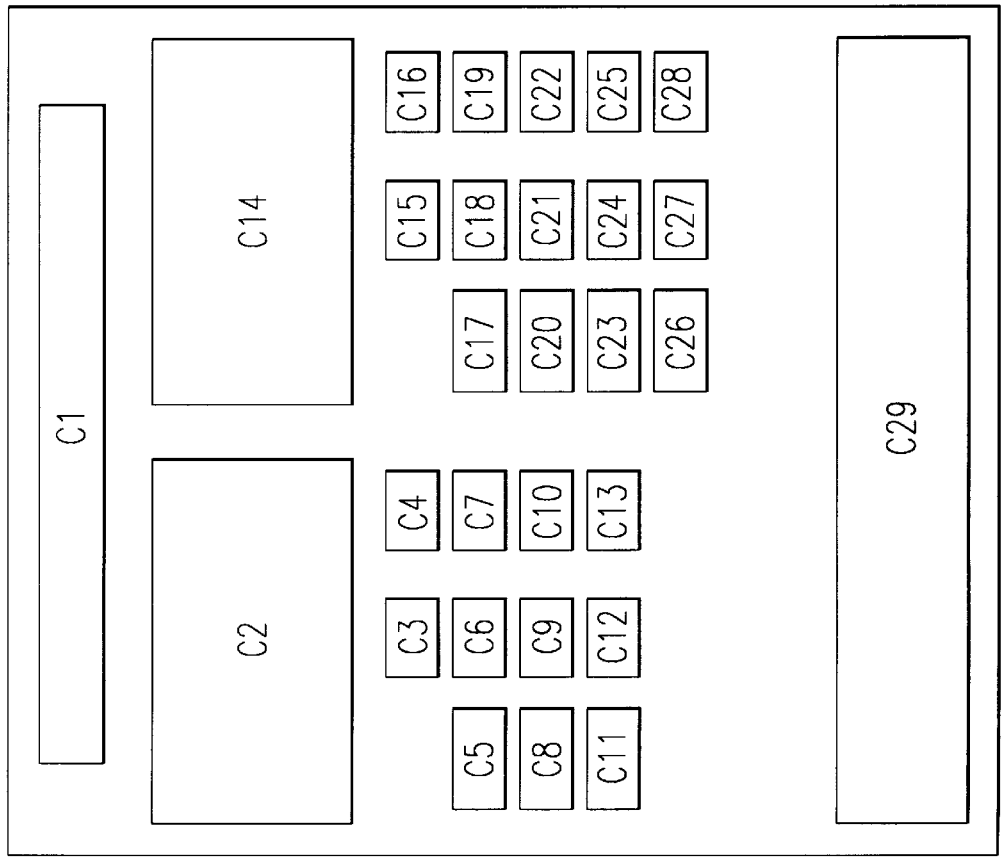
FIG. 16 is an illustration showing a result of a character recognition processing on the input document shown in FIG. 15.

Next, another process of copying (scanning, OCR processing, storing and printing) with the areas for the character recognition processing being designated is explained referring to FIGS. 14–16. For an original document as shown in FIG. 15, the areas made of character image areas (excluding figures) are first designated for processing via the area designating unit 380 in step S61 of FIG. 14. The document is then scanned or read by the image scanner 100 and stored in the input memory of the memory unit in 330 step S62. Alternatively, the document may first be scanned and then have the character areas designated. The recognition pre-processor 340 recognizes and extracts the areas made of character images in step S63. The pre-processor then generates the area information and the order of processing of the extracted character areas designated C1–C29 in FIG. 16. The character recognition unit 350 performs recognition processing on each of the characters in the extracted areas in step S64 in the order of processing as determined by the preprocessor (or appearance in the document), records the result of the recognition in step S65, draws or generates the result of the recognition in step S66, and prints out the result in step S67. As explained above, original documents which contain figures and tables in addition to character images also can be processed for character recognition.

Figure 17:
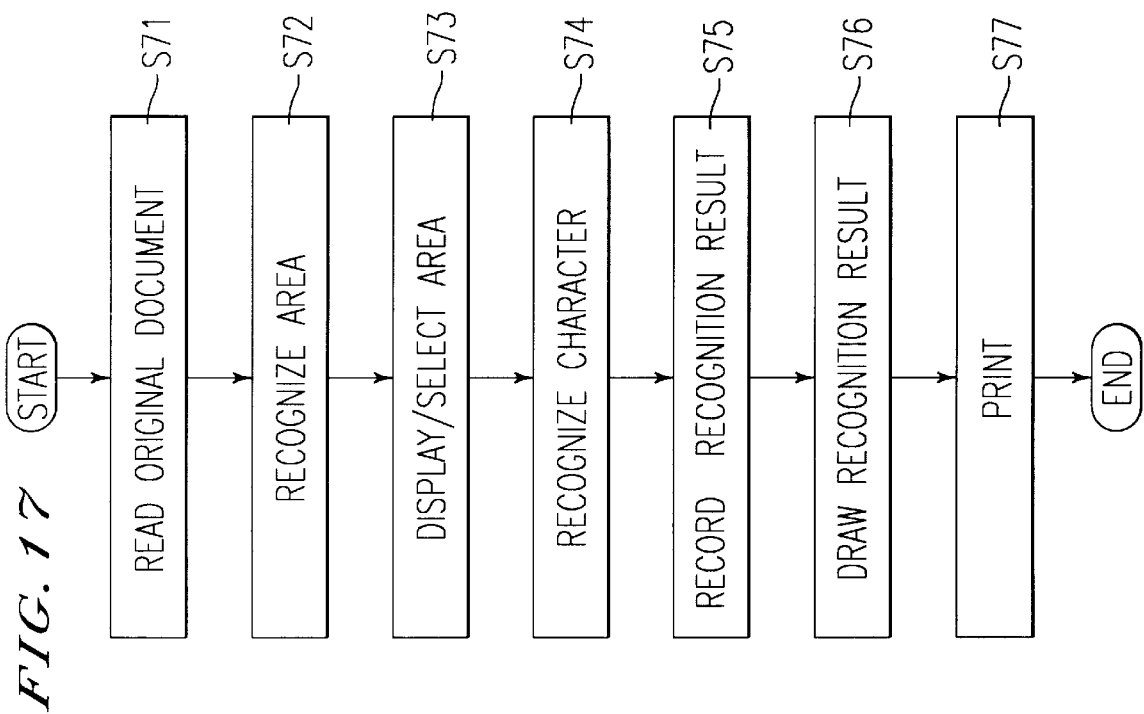
FIG. 17 is a flowchart explaining an outline of a copying process in which areas for a character recognition processing are designated through another method.
Figure 18:
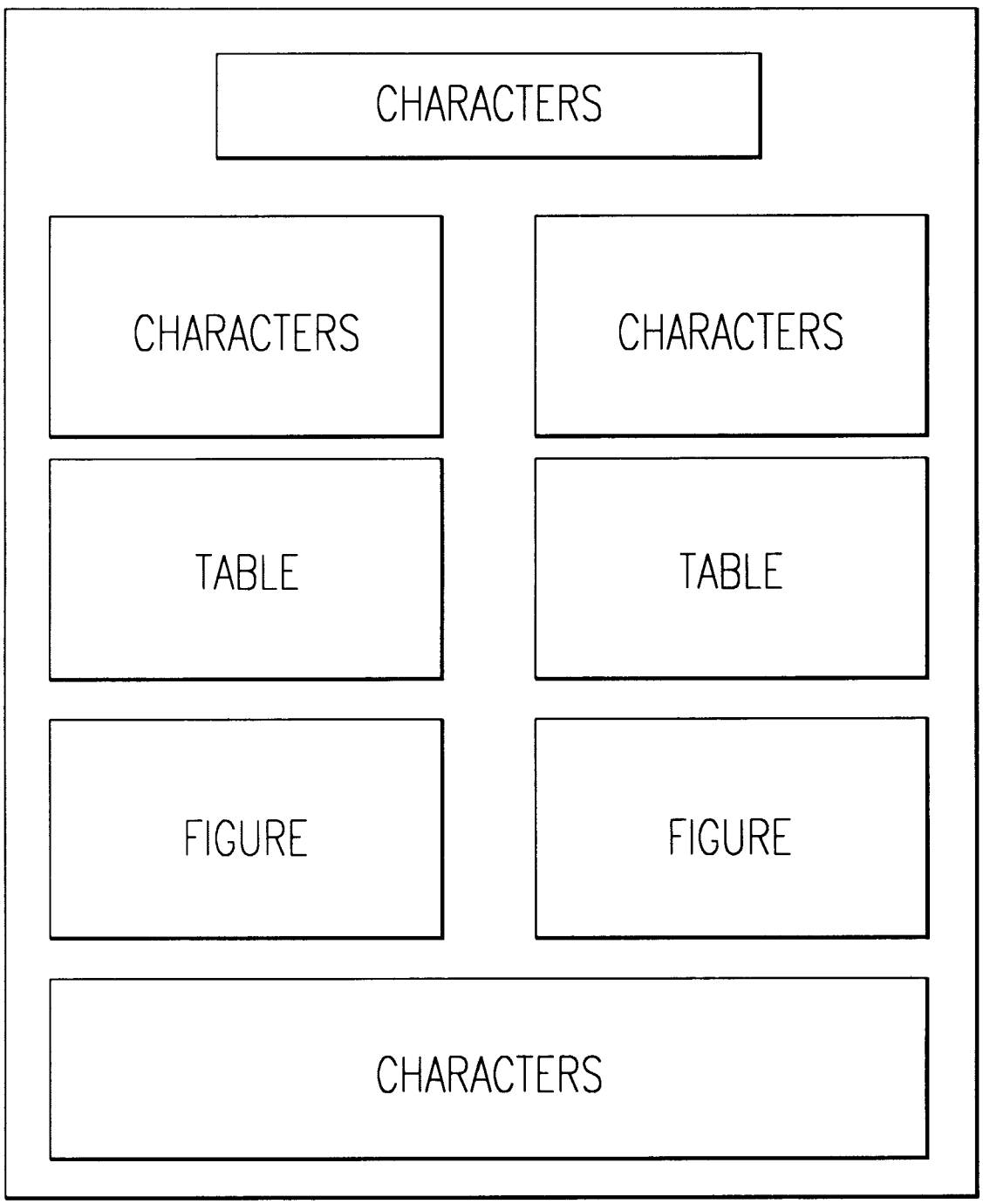
FIG. 18 is an illustration showing the result of the area recognition processing shown in FIG. 17.

Next a process of copying (scanning, OCR processing, storing and printing) with the areas for character recognition being designated by an another method is explained referring to FIGS. 17 and 18. After an original document as shown in FIG. 15 is scanned in step S71 by the image scanner 100 and stored in the input image memory 330, the recognition pre-processor 340 recognizes separately in step S72 the areas made of character, table and figure images respectively and obtains the result as shown in FIG. 18. The details of this processing are disclosed in U.S. Pat. No. 5,195,147 which is incorporated herein by reference. Then, the main controller 320 receives area information which is the result of the recognition of areas as illustrated in FIG. 18 and displays the same on the user interface 310 so that the operator can select the areas to be processed in step S73. The recognition unit 350 performs character recognition processing on the areas selected by the operator in step S74, records or stores the result of the recognition processing in step S75 and draws or generates the result to be printed in step S76 and prints the result in step S77. Thus, the operator can designate the areas to be processed by simply selecting the various areas displayed on the user interface 310, without the need to manually draw the areas to be processed using the area designating unit 380.

Figure 19:
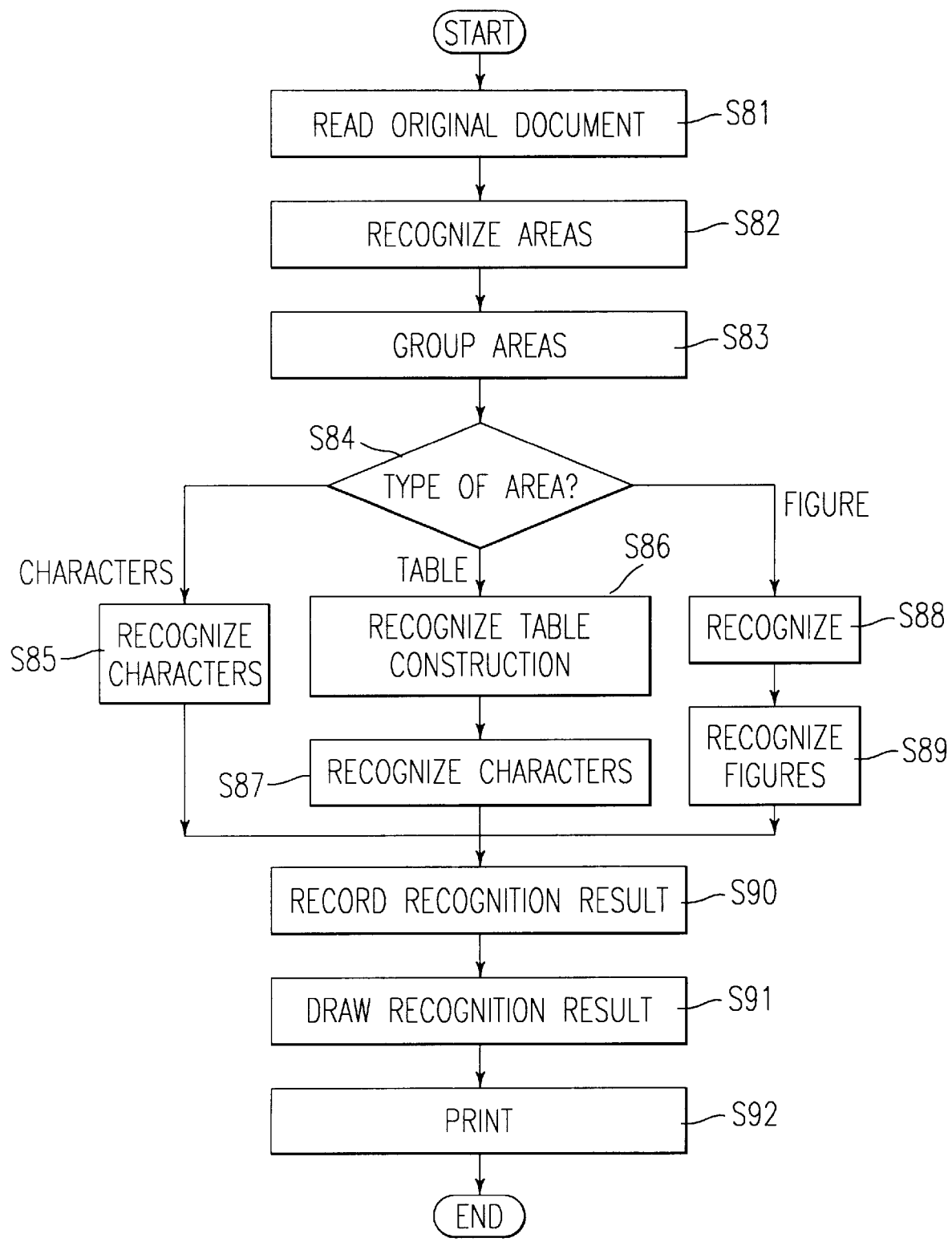
FIG. 19 is a flowchart illustrating a process of performing a recognition processing on areas made of characters, tables, and figures, respectively.
Figure 20:
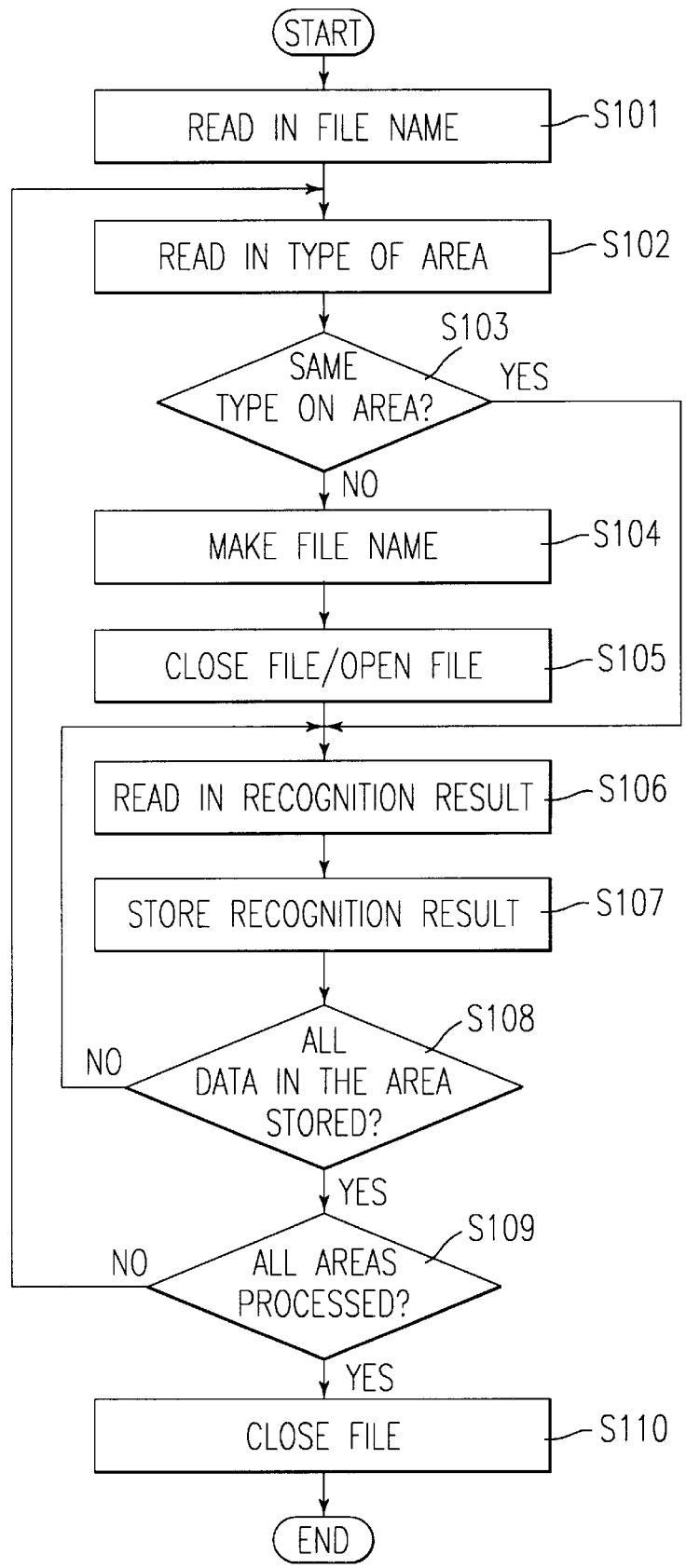
FIG. 20 is a flowchart illustrating in detail a process of recording a result of the recognition processing shown in FIG. 19.
Figure 21:
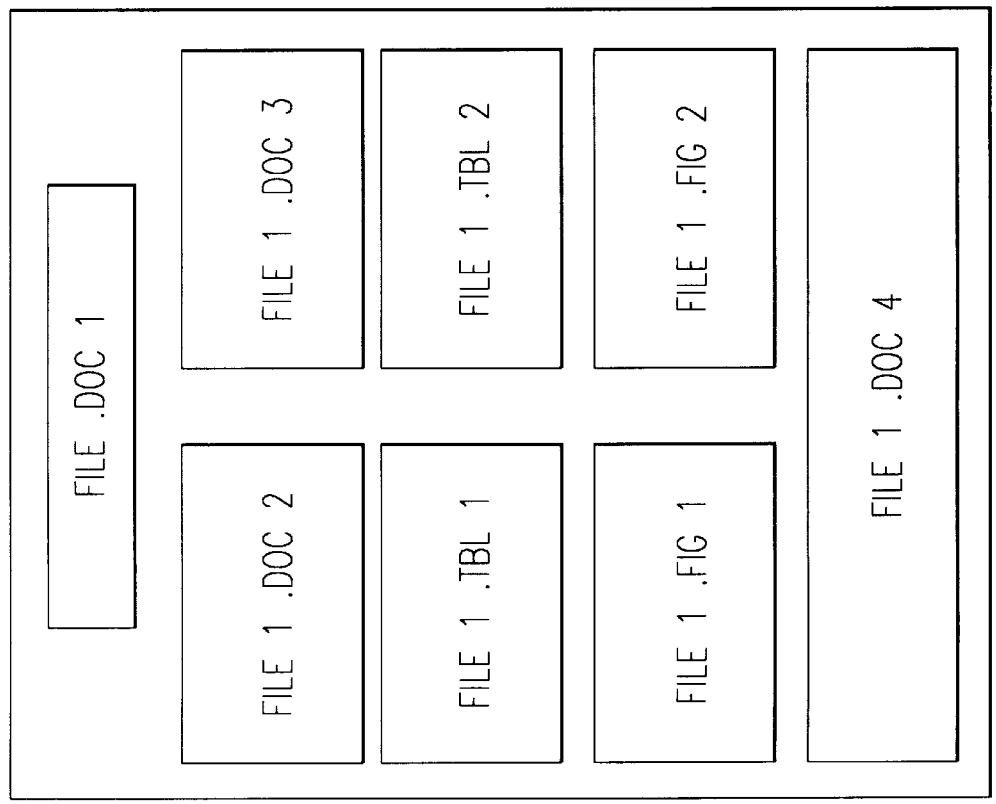
FIG. 21 is an illustration showing the file names assigned to the areas illustrated in FIG. 18.

Next, a process of generating and using different file names for each area recognized is explained referring to FIGS. 19–21. After an original document as shown in FIG. 15 is scanned or read by the image scanner 100 in step S81 of FIG. 19 and stored in the input of the memory unit memory 330, the recognition pre-processor 340 recognizes separately the areas made of characters image, table images and figure images respectively and obtains the result of the recognition processing as shown in FIG. 18 to be displayed on the user interface 310 in step S82. Then, the areas are grouped in accordance with the kind of images contained in the areas in step S83.

Next, the recognition unit 350 performs a recognition processing on each of the areas. Step S84 first determines the type of area being processed. If the area contains character images, step S85 is performed which recognizes the characters. If the area contains tables, step S86 recognizes the construction or layout of the table and step S87 recognizes the characters making up the table. If step S84 determines that the area is a figure, the scanned bit map representation of the figure is converted to a vector representation in step S88 and the figures therein recognized in step S89. Steps S84–S89 are performed as necessary for each of the areas. The result of such recognition processing by the recognition unit 350 is recorded in step S90 with a different file name for each area illustrated in FIG. 21 and described as in detail in FIG. 20. The image to be printed is drawn or generated in steps S91, and printed in step S92.

A feature of the present invention is the manner in which file names are assigned to the various areas of a document. By using different file names for the different areas of a document, it is possible to perform different functions on the different areas of the document at a later time in a simple manner without reading or processing every area of the document. A method for storing the result of recognition processing with different file names for each area is explained with respect to FIG. 20. In FIG. 20, after starting, in step S101 the main controller 320 reads in a file name entered through the user interface 310 or reads a file name which has been automatically assigned. Next, step S102 begins processing of the different areas and reads in the type of area currently being processed in step S102. Step S102 is performed by the recognition pre-processor 340. Step S103 determines if the area being processed is the same type as a previous area being processed. If it is not, or if this is the first time step S103 is being performed, step S104 is performed which creates the actual file name. The step of creating the file name assigns an extension or other portion of the file name which indicates whether the area contains characters and is a character area, is a table, or is a figure. Step S105 then closes any file which may be open and then opens a file having the name which was created in step S104.

After step S105 or when there is an affirmative answer in step S103, step S106 reads a recognition result for the specific area being processed and step S107 stores the recognition result in the open file. Steps S106 and S107 are repeated until S108 determines that all data in the area has been stored. After this area has been processed, step S109 determines if all areas have been processed. If they have not, flow returns back to step S102 and when all areas have been processed, step S110 closes the file and the process ends.

The flowchart illustrated in FIG. 20 may be interpreted as using one file for all areas of a document having a specific type. For example, all characters can be stored in a character file, all tables are stored in a table file, and all of the figures are stored in a figure file. However, as an alternative to the flowchart illustrated in FIG. 20, it is possible to assign each area of the document a unique file name as illustrated in FIG. 21. In FIG. 21, it is seen that the information on the page is stored in eight different files. Each of the eight files has a common portion of its name being "file1." However, each of the files also has a unique extension such as doc1, doc2, doc3, tbl1, tbl2, fig1, fig2, and doc4. In order to create the files illustrated in FIG. 21, the extension of the file name is assigned to indicate the type of file such as a table, figure, or a character portion of the document, and has a number indicating the specific area number. In contrast, the flowchart of FIG. 20 may assign only one file name such as "file1.doc" for all character sections of the document, a file "file1.tbl" for all table sections of the document, and a file "file1.fig" for all of the figures. The process illustrated in FIG. 20 and the process used to generate the file illustrate in FIG. 21 allow automated assigning of file names. Further, since the area information is displayed showing the file names for each area as illustrated in FIG. 21, it is easy to identify in which file each area is stored. Further, assigning a file name which indicates whether the file is a character section, a table or a figure allows a user to more readily determine the contents of the files simply by looking at the file names. After the files are created, the invention includes the use of specific software to process the files. For example, word processing software such as WordPerfect or Word may be used to process the character files, image processing software such as Corel Draw or Auto Cad may be used to process the image files, etc.

Figure 23:
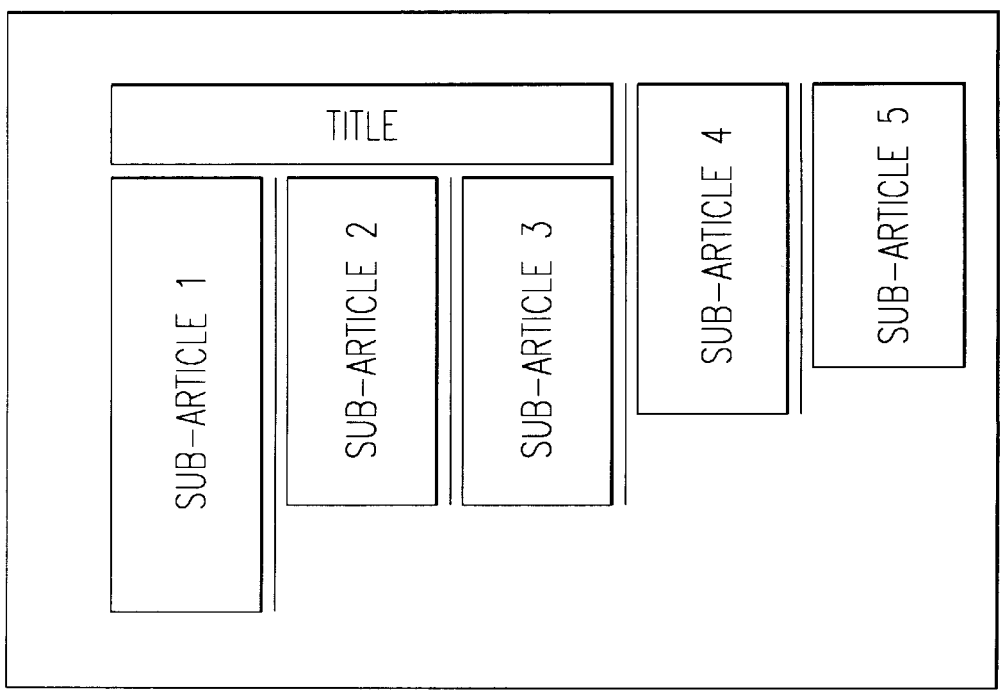
FIG. 23 is an illustration showing an original Japanese document made of a plurality of articles.

Another feature of the present invention is the efficient use of paper by rearranging the positions of information on the page. The rearrangement also allows the information to be utilized more easily. For example, in newspapers and magazines, one article will consist of a title and plural blocks of sub-articles. Often, the blocks of sub-articles are arranged in a complex manner such as illustrated in FIG. 23 which illustrates a Japanese language document. As the article is in Japanese, the article is read from left to right and from top to bottom. In FIG. 23, first the title is read, followed by sub-article 1, sub-article 2, etc. In FIG. 23, it is seen that there is extra space at the lower left portion of the document and the present invention pertains to the efficient use of paper space and making the information easier to utilize by rearranging the sub-articles of the article.

Figure 22:
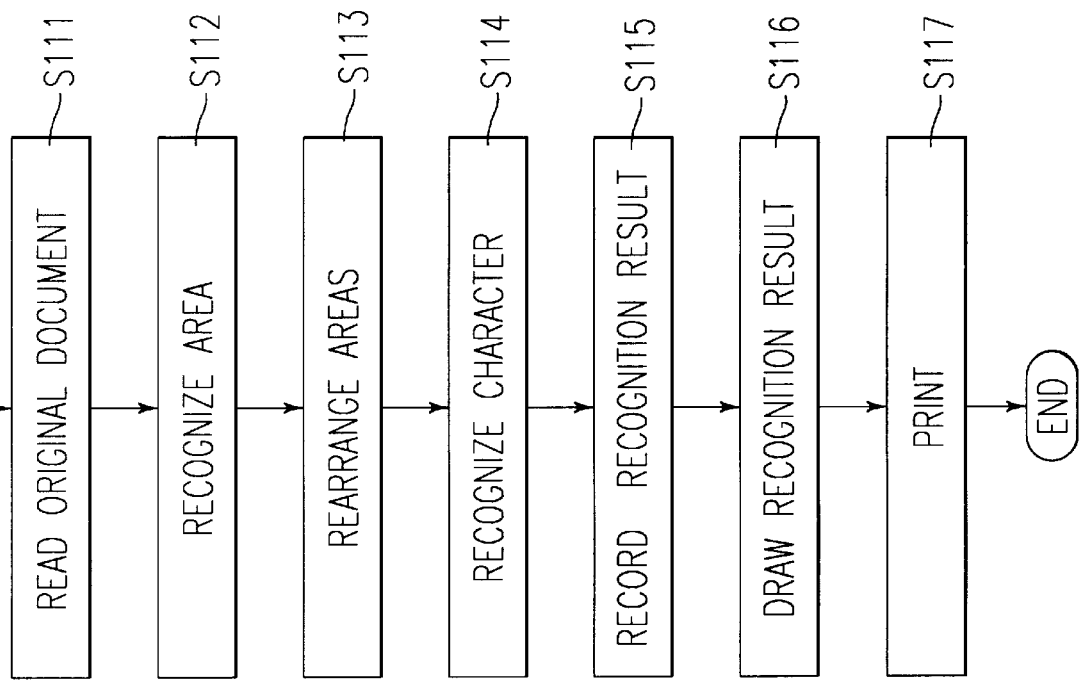
FIG. 22 is a flowchart explaining an outline of a copying process in which a shape of an area designated as made of character images is corrected.
Figure 24:
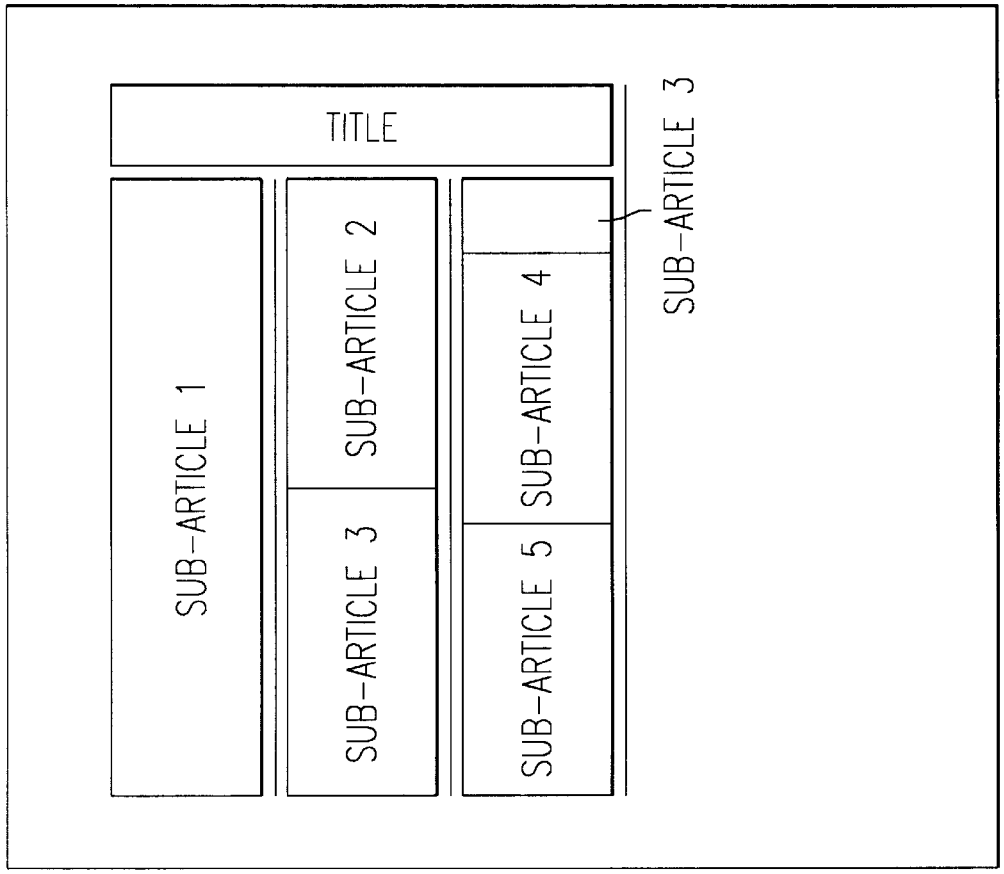
FIG. 24 is an illustration showing an example resulting from modification of the Japanese document of FIG. 23.
Figure 25:
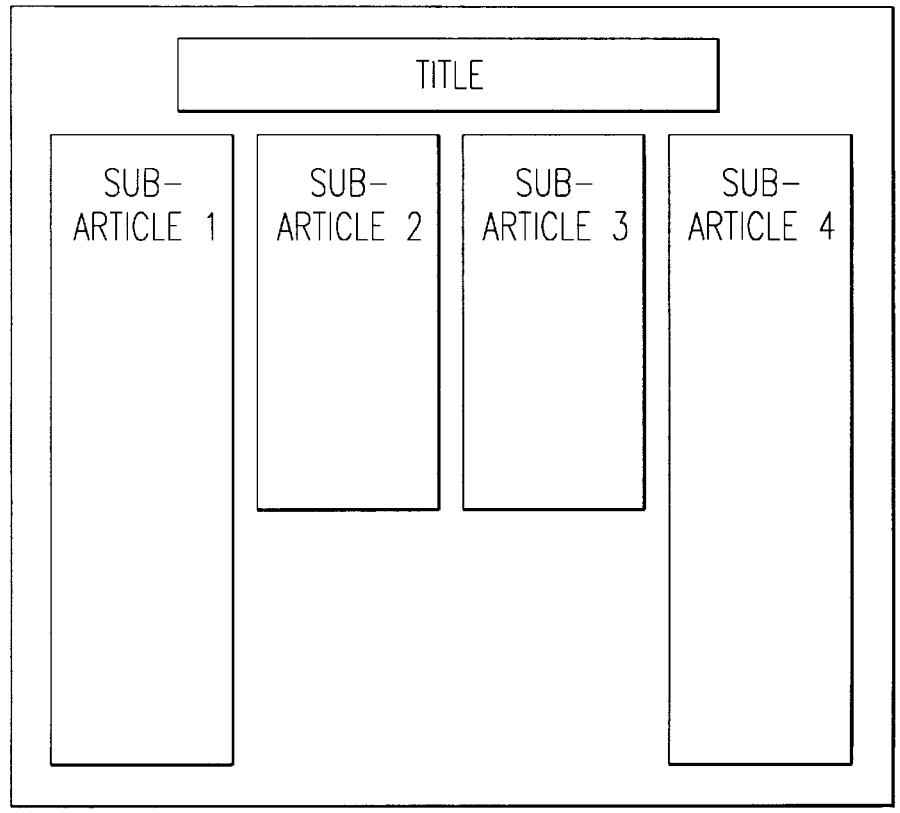
FIG. 25 illustrates an original English language document containing a plurality of sub-articles.
Figure 26:
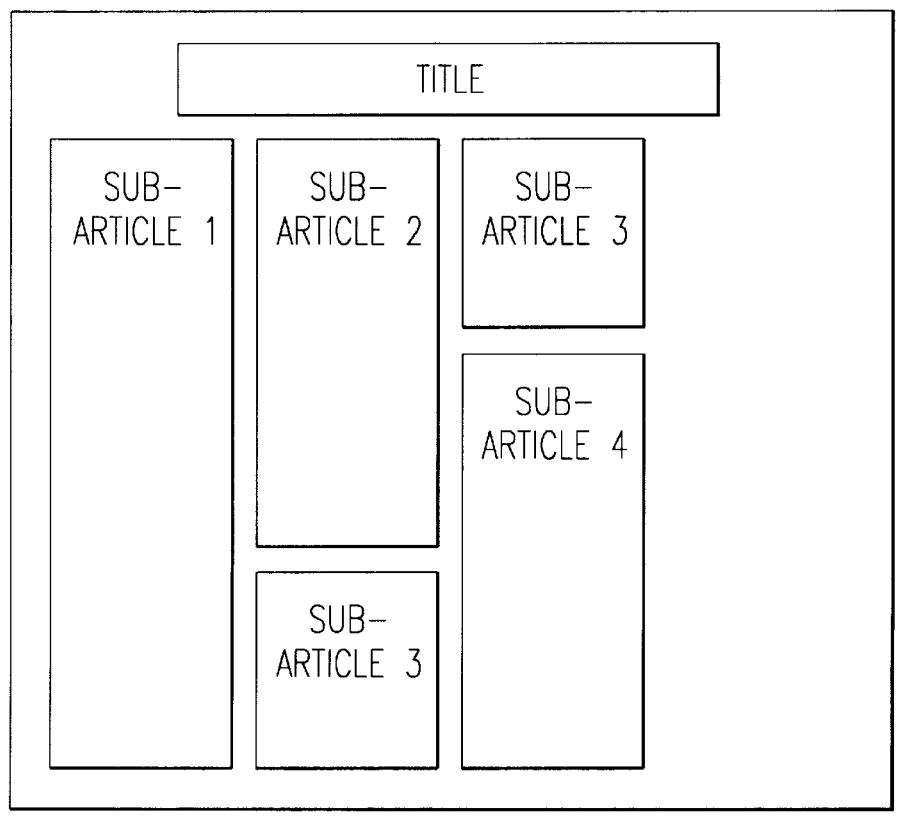
FIG. 26 illustrates the output after processing the document illustrated in FIG. 25.

The process illustrated in FIG. 22 rearranges and changes the shapes of the sub-articles, as necessary, in order to have efficient use of the taper. In FIG. 22, after starting, the original document is scanned by the image scanner 100 in step S111 and stores the scanned image in the input memory of the memory unit 330. Step S112 then recognizes the different areas making up the document including character images, table images, and figures. Step S113 then rearranges the areas to result in the document illustrated in FIG. 23. The manner of rearranging the areas (and consequently the sub-articles) is to leave the title in its original position, and to eliminate blank space (excluding the margin) on the left portion of the page. For example, it can be seen that a portion of the sub-article 3 is moved next to the sub-article 2. The remaining portion of the sub-article 3 which will not fit next to the sub-article 2 in FIG. 24 is placed on the next lower row, as illustrated in FIG. 24. In a similar manner, FIGS. 25 and 26 illustrate an English language document, FIG. 26 illustrating an efficient arrangement of the sub-articles of FIG. 25. In FIGS. 25 and 26, it is seen that a portion of the sub-article 3 is moved beneath the sub-article 4 while a remaining portion of the sub-article 3 is moved beneath the title. Also, the sub-article 4 is moved underneath the sub-article 3.

After the areas are rearranged in step S113, the recognition unit 350 performs character recognition processing on the areas selected by the operator in step S114. Thereafter, the results of the recognition process are stored in S115, the results of the recognition processing are drawn or generated in step 116, and the result is subsequently printed out in step 117. Therefore, the present invention minimizes the need for correction after processing by the invention and also prints out a result of the recognition in an easy-to-read format.

The present invention operates by processing signals representing images and transforms those signals to be a document or page represented by character codes. This invention may be conveniently implemented using a conventional general purpose digital computer program according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium including instructions which can be used to program a computer to perform a process of the invention. The storage medium can include, but is not limited to, any type of disk including floppy disks, optical discs, CD-ROMs, and magneto-optical disks, ROMs, RAMs, EPROMs, EEPROMs, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by letters patent of the United States is:

1. A computer implemented method of processing a document, comprising the steps of:
    inputting an image of the document, the image including character images and at least one figure;
    dividing the image of the document into different areas including at least one character area containing the character images and at least one figure area containing the at least one figure;
    processing the at least one character area to obtain character codes representing the character images;
    writing the character codes representing the character images into a first file; and
    writing the at least one figure into a second file which is different from the first file.

2. A method according to claim 1, wherein:
    the dividing step includes dividing the image of the document into different areas including at least one table area containing at least one table; and
    the method further comprises the step of:
    writing the at least one table into a third file, different from the first and second files.

3. A method according to claim 1, further comprising the step of:
    determining names for the first file and the second file using a computer implemented method.

4. A method according to claim 3, wherein the step of determining names includes determining names for the first file and the second file which have at least a common portion.

5. A method according to claim 3, wherein the step of determining names includes determining names for the first file and the second file which have at least four characters in common appearing in a same order and position.

6. A method according to claim 4, wherein the step of determining names writes a number in the names of the first and second files corresponding to an order in which the at least one character area and at least one figure appear in the document.

7. A method according to claim 1, wherein said character images are divided into a plurality of columns, said method further comprising the steps of:
   recognizing, using image processing, empty space next to one of said columns; and
   moving a portion of another of said columns to said empty space.

8. A method according to claim 7, further comprising the step of:
   moving a second portion of said another of said columns which is different from said portion of said another of said columns to a position from which said portion of said column was moved.

9. A method according to claim 7, wherein said processing step processes said portion of another of said columns which has been moved by the moving step.

10. A method according to claim 1, further comprising the step of:
    displaying said different areas along with names of the first and second files.

11. A method according to claim 1, wherein said inputting step comprises scanning the document using a scanner.

12. A method according to claim 11, wherein each of said steps are performed in a digital copier.

13. A computer implemented method of processing a document, comprising the steps of:
    inputting an image of the document including a plurality of columns;
    recognizing, using image processing, empty space next to one of said columns; and
    moving a portion of another of said columns to said empty space which was recognized using image processing.

14. A method according to claim 13, further comprising the step of:
    moving a second portion of said another of said columns which is different from said portion of said another of said columns to a position from which said portion of said another of said columns was moved.

15. An article of manufacture including a computer readable medium having computer program logic recorded thereon for processing a document, comprising:
    means for inputting an image of the document, the image including character images and at least one figure;
    means for dividing the image of the document into different areas including at least one character area containing the character images and at least one figure area containing the at least one figure;
    means for processing the at least one character area to obtain character codes representing the character images;
    means for writing the character codes representing the character images into a first file; and
    means for writing the at least one figure into a second file which is different from the first file.

16. An apparatus for processing an image of a document including character images and at least one figure, comprising:
    means for dividing the image of the document into different areas including at least one character area containing the character images and at least one figure area containing the at least one figure;
    means for processing the at least one character area to obtain character codes representing the character images;
    means for writing the character codes representing the character images into a first file; and
    means for writing the at least one figure into a second file which is different from the first file.

17. An apparatus according to claim 16, wherein:
    the means for dividing includes means for dividing the image of the document into different areas including at least one table area containing at least one table,
    the apparatus further comprising:
        means for writing the at least one table into a third file, different from the first and second files.

18. An apparatus according to claim 16, further comprising:
    means for determining names for the first file and the second file using a computer implemented method.

19. An apparatus according to claim 18, wherein the means for determining names comprises means for determining names for the first file and the second file which have at least a common portion.

20. An apparatus according to claim 19, wherein the means for determining names includes means for determining names for the first file and the second file which have at least four characters in common appearing in a same order and a same position.

21. An apparatus according to claim 19, wherein the means for determining names writes a number in the names of the first and second files corresponding to an order in which the at least one character area and at least one figure appear in the document.

22. An apparatus according to claim 16, wherein said character images are divided into a plurality of columns, said apparatus further comprising:
    means for recognizing, using image processing, empty space next to one of said columns; and
    means for moving a portion of another of said columns to said empty space.

23. An apparatus according to claim 22, further comprising:
    means for moving a second portion of said another of said columns which is different from said portion of said another of said columns to a position from which said portion of said column was moved.

24. An apparatus according to claim 22, wherein said processing means processes said portion of another of said columns which has been moved by the moving means.

25. An apparatus according to claim 16, further comprising:
    means for displaying said different areas along with names of the first and second files.

26. An apparatus according to claim 16, further comprising:
    a scanner for obtaining the image of the document.

27. An apparatus according to claim 16, wherein said apparatus is a digital copier.

28. An apparatus for processing an image of a document including a plurality of columns, comprising:
   means for recognizing, using image processing, empty space next to one of said columns; and
   means for moving a portion of another of said columns to said empty space which was recognized using image processing.

29. An apparatus according to claim 28, further comprising:
   means for moving a second portion of said another of said columns which is different from said portion of said another of said columns to a position from which said portion of said another of said columns was moved.

* * * * *